United States Patent
Niu

(10) Patent No.: US 11,005,600 B2
(45) Date of Patent: May 11, 2021

(54) METHOD AND DEVICE FOR ACQUIRING DATA VIA CHANNELIZED OPTICAL PORT STM-4 HDLC

(71) Applicant: Beijing Zhongchuang Telecom Test Co., Ltd, Beijing (CN)

(72) Inventor: Lingling Niu, Beijing (CN)

(73) Assignee: BEIJING ZHONGCHUANG TELECOM TEST CO., LTD, Beijing (CN)

( * ) Notice: Subject to any disclaimer, the term of this patent is extended or adjusted under 35 U.S.C. 154(b) by 0 days.

(21) Appl. No.: 16/583,739

(22) Filed: Sep. 26, 2019

(65) Prior Publication Data

US 2020/0127764 A1 Apr. 23, 2020

(30) Foreign Application Priority Data

Oct. 18, 2018 (CN) .......................... 201811214792.7

(51) Int. Cl.
*H04L 1/00* (2006.01)
*H04L 29/06* (2006.01)
*H04L 29/08* (2006.01)

(52) U.S. Cl.
CPC ............ *H04L 1/0083* (2013.01); *H04L 69/22* (2013.01); *H04L 69/324* (2013.01)

(58) Field of Classification Search
CPC ................... H04L 69/321; H04J 3/1617; H04J 2203/0035
See application file for complete search history.

(56) References Cited

U.S. PATENT DOCUMENTS

2001/0012288 A1* 8/2001 Yu .......................... H04L 69/168
370/352

\* cited by examiner

*Primary Examiner* — Chandrahas B Patel
(74) *Attorney, Agent, or Firm* — Getech Law LLC; Jun Ye

(57) ABSTRACT

The present invention includes: receiving an optical signal from a transmission link via an STM-4 optical port; converting the received optical signal into an electrical signal; recovering an E1 signal; performing HDLC link deframe mapping, removing a frame header and an interpolated zero part in the HDLC link, and extracting the payload of a sliced HDLC packet; and processing and outputting a received HDLC data stream to a host. The present invention further provides a device for acquiring data via a channelized optical port STM-4 HDLC according to the method for acquiring data via a channelized optical port STM-4 HDLC.

8 Claims, 3 Drawing Sheets

METHOD AND DEVICE FOR ACQUIRING DATA VIA CHANNELIZED OPTICAL PORT STM-4 HDLC

TECHNICAL FIELD

The present invention relates to the field of communications, in particular to the field of data acquisition.

BACKGROUND ART

With the constant development of a communication technology and the increasing complexity of a communication network, signaling, as the nerve of the communication network, supports and controls the normal operation of the communication network. Signaling No. 7 is currently the most important inter-office signaling in China, and is widely used in both a fixed network and a mobile network. Signaling No. 7 network, as a nerve hub of modern network communication, plays a growing role in communication, and becomes more and more important. Signaling No. 7 protocol bears all the information required for the operation of a service network, and is a very valuable information resource. The signaling No. 7 protocol can accurately and effectively acquire relevant information, and provide effective support means for the management and maintenance of the whole communication network and the monitoring and analysis of service quality.

In a signaling No. 7 monitoring system, the accurate acquisition and reliable transmission of a signaling packet are the prerequisite and basis for the success of the whole system. The signaling No. 7 links in China all operate in PCM lines. The commonest line code pattern in the PCM lines is HDB3 code, wherein E1 uses the HDB3 code. It can be seen from the time slot feature of E1 in a PCM (pulse code modulation) code that E1 is totally divided into 32 time slots, namely TS0-TS31, wherein each time slot is 64K; the TS0 time slot is used for frame delimitation, and the other time slots can transmit data, and can also transmit a speech and a signaling.

The signaling links E1 bears are classified into three types: the first is to use the entire 2M as one link, such as a high rate 2 Mbit/s link; the second is to divide 2M into 31 time slots, 64K for each time slot, and the combinations thereof N64K (31>=N>=1); for example, when N=1, the signaling link is 64 Kbit/s that people are familiar with, and when N=31, the signaling link is 2 Mbits/s. The values of N are different, and the locations of the N 64K are different; therefore, the combinations of N64K are varied; and the third one is the link the sub-time slots of which are 8K, 16K and 32 k; and the third link is generally used in an Abis interface.

At present, data acquisition methods are mainly divided into two types according to different network devices and networking modes:

1. E1 electrical port link, most links in existing networks are such type of links at present; the access method is high resistance cross connection; and the E1 electrical port link can directly use an electrical port acquisition card to perform acquisition. Different types of links can be converged to one E1 by a convergence device, so as to improve the utilization ratio of an acquisition device.

2. Optical port link, the acquisition optical port in existing networks at present is mainly a synchronous transmission module with the rate 155.520 Mbps, namely the STM-1 optical transmission link; the data can also be transmitted on a higher rate optical transmission link such as STM-4, STM-16 and the like, in which case, however, an optical port acquisition card with higher acquisition capability is required.

In order to improve the data acquisition integration level, the electrical interfaces of method 1 can be first converged; then a plurality of electrical interface links are converted into an optical interface via an electrical-optical conversion device; and finally an optical port acquisition card is used to perform acquisition. Alternatively, the low rate optical interfaces of method 2 can also be converted to a higher rate optical interface.

At present, existing test cards can only monitor 2M and 155M interfaces, but has no monitoring means for the newly emerging and persistently increasing STM-4 622M link on the Internet. On the other hand, 2M and STM-1 155M acquisition cards have a low integration level, and occupy card insertion positions of a server, while the acquired data only uses a small part of performances of the server, thus wasting the capability of the server.

In view of the two situations, the newly researched STM-4 622M acquisition card not only fills the gap of STM-4 622M acquisition, but also improves the acquisition integration level of a single card, saves the card slot positions of the server, and improves the utilization ratio of the server, thus greatly reducing the number of deployed servers, reducing investment cost, and satisfying the application of an acquisition product line.

SUMMARY OF THE INVENTION

The technical problem to be solved by the present invention is the data acquisition problem of STM-4.

The present invention is specifically realized through the following technical solution:

A method for acquiring data via a channelized optical port STM-4 HDLC, specifically, the method comprising:

Optical signal receiving: receiving an optical signal from a transmission link via an STM-4 optical port;

Signal conversion: converting the received optical signal into an electrical signal;

E1 signal recovery: recovering a 252-link E1 signal by means of signal processing; specifically, recovering an E1 signal comprises:

Clock data recovery: extracting a line clock from the electrical signal, and recovering clock data;

Synchronously positioning the start and end of a data identifier frame, and completing frame delimitation;

Descrambling, decoding the received data, and recovering the original SDH data;

Overhead and payload extraction: processing a section overhead, and extracting the payload; and Signal recovery: progressively removing the channel overheads and adjustment pointers of VC-4, TUG-3, TUG-2, TUG-12 and VC-12, then recovering a 252-link E1 signal, and mapping the E1 signal to an SBI bus.

Physical layer alarm error code detection, for detecting in real time acquired SDH alarm error code information, wherein the alarm error code information comprises but not limited to: LOS, LOF, OOF, MS-AIS, AU-LOP, B1, B2 and B3 alarm error codes;

HDLC frame processing: performing HDLC link deframe mapping on the received data, removing a frame header and an interpolated zero part in the HDLC link, and extracting the payload of a sliced HDLC packet;

HDLC service processing: receiving, processing and outputting a recovered HDLC data stream; specifically, HDLC service processing comprises:

Data processing: adding packet header information and an identifier for the data, and decoding and counting the data, wherein adding packet header information and an identifier for the data comprises: adding the packet header information such as a port number, a time stamp, a length domain and the like, identifying a fill-in signaling unit, a link state signaling unit, and a message signaling unit;

Data storage: storing the processed data in a memory; and

Data transmission: transmitting the data to a host.

A device for acquiring data via a channelized optical port STM-4 HDLC, comprising:

A host control module, for transmitting configuration information; specifically, the configuration information comprises but not limited to: configured link type, HDLC frame type, and E1 time slot occupation;

An optical module, for receiving a signal and performing electrical signal-optical signal mutual conversion; specifically, a receiving terminal of the optical module converts an optical signal into an electrical signal, and a transmitting terminal converts an electrical signal to an optical signal;

An SDH multiplexing module, for processing an SDH signal, recovering an E1 signal, and mapping the E1 signal to an SBI bus; specifically, the SDH multiplexing module comprises:

A clock data recovery unit, for extracting a line clock from the electrical signal, and recovering clock data;

A synchronously positioning unit, for synchronously positioning the start and end of a data identifier frame, and completing frame delimitation;

A descrambling unit, for decoding data, and recovering the original SDH data;

An overhead and payload extraction unit, for processing a section overhead and extracting the payload;

An E1 signal recovery unit, for progressively removing the channel overheads and adjustment pointers of VC-4, TUG-3, TUG-2, TUG-12 and VC-12, then recovering a 252-link E1 signal, and mapping the E1 signal to an SBI bus; and A physical layer alarm error code detection unit, for detecting in real time acquired SDH alarm error code information;

An HDLC framing module, for performing HDLC link deframe mapping, removing a frame header and an interpolated zero part in the HDLC link, and extracting the payload of a sliced HDLC packet; namely recovering an HDLC data stream; and An HDLC service module: for receiving, processing and outputting the recovered HDLC data stream; specifically, the HDLC service processing module comprises:

A data processing unit, for adding packet header information and an identifier for the data, and decoding and counting the data, and comprising: adding the packet header information such as a port number, a time stamp, a length domain and the like, identifying a fill-in signaling unit, a link state signaling unit, and a message signaling unit, and decoding and counting the data;

A data storage unit, for storing the processed data in a memory; and

A data transmission unit, for transmitting the data to a host.

With the above-described technical solution, the method and device for acquiring data via a channelized optical port STM-4 HDLC in the present invention have the following beneficial effects:

1) The method for acquiring data via a channelized optical port STM-4 HDLC provided by the present invention improves the integration level and efficiency of the data acquisition card by several times or even hundreds of times;

2) The device for acquiring data via a channelized optical port STM-4 HDLC provided by the present invention has a smart structure, can be used upon being inserted in a computer equipped with a PCI-E interface, can acquire STM-4 622M data without the aid of external optical transmitter and receiver, and can also be secondarily developed if necessary.

3) The device for acquiring data via a channelized optical port STM-4 HDLC provided by the present invention not only fills the gap of STM-4 622M acquisition, but also improves the acquisition integration degree of a single card, saves the card slot positions of a server, and improves the utilization ratio of the server, thus greatly reducing the number of deployed servers.

BRIEF DESCRIPTION OF THE DRAWINGS

In order to more clearly illustrate the technical solutions in the embodiments of the present invention or in the prior art, the drawings which are required to be used in the description of the embodiments or the prior art will be briefly introduced hereafter. It would be obvious that the drawings described below are only a few embodiments of the present invention. And a person skilled in the art could obtain other drawings according to the accompanying drawings without involving an inventive effort.

DETAILED DESCRIPTION OF EMBODIMENTS

The technical solutions in the embodiments of the present invention will be clearly and completely described hereafter in combination with the drawings in the embodiments of the present invention. It is apparent that the described embodiments are only a part of the embodiments of the present invention, but not the whole. On the basis of the embodiments in the present invention, all the other embodiments obtained by a person skilled in the art without involving an inventive effort are all of concluded in the protection scope of the present invention.

Figure 1:
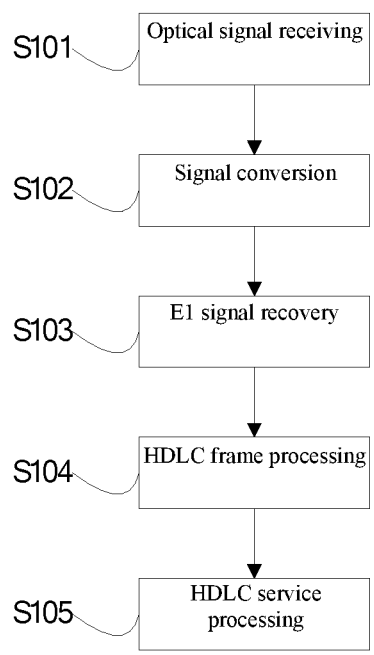
FIG. 1 is the method for acquiring data via a channelized optical port STM-4 HDLC provided in one embodiment of the present invention.

One embodiment of the present invention provides a method for acquiring data via a channelized optical port STM-4 HDLC. As shown in FIG. 1, the method comprises:

S101, optical signal receiving: receiving an optical signal from a transmission link via an STM-4 optical port;

S102, signal conversion: converting the received optical signal into an electrical signal via an electrical-optical signal conversion device, and transmitting the electrical signal out;

S103, E1 signal recovery: acquiring a 252-link E1 signal by means of signal processing, wherein the signal processing comprises: first extracting a line clock from the electrical signal, recovering clock data; then positioning the start and end of a data identifier frame, and completing frame delimitation; next, decoding the received data, and recovering the original SDH data; further processing a section overhead, and extracting the payload; and finally progressively removing the channel overheads and adjustment pointers of VC-4, TUG-3, TUG-2, TUG-12 and VC-12, recovering the 252-link E1 signal, and mapping the signal to an SBI bus. In the process, physical layer alarm error codes should also be performed, wherein the alarm error code information comprises but not limited to: LOS, LOF, OOF, MS-AIS, AU-LOP, B1, B2 and B3 alarm error codes; and S104, HDLC frame processing: performing HDLC link deframe mapping, removing a frame header and an interpolated zero part in the HDLC link, and extracting the payload of a sliced HDLC packet; specifically, each HDLC link occupies channel packet FIFO data with 8 consecutive long fields; the bit width of the channel packet FIFO is in units of a long field, namely 32 bits. Parallel-serial conversion is performed on the 32 bits data read from the channel packet FIFO; a frame header indication signal, an error frame indication signal and an HDLC link process enabling indication signal are generated according to the HDLC serial data stream, and are transmitted to an HDLC zero removing module. In the interpolated zero removing process, if the frame header indication signal is encountered, then the data packet of the HDLC channel is already ended, and the next process will begin; and if the error frame indication signal is encountered, then the processing of the current data packet will be ended, and the data packet of the HDLC channel will be discarded; and the interpolated zero removing process will re-start when the next frame header indication signal is received.

S105, HDLC service processing: receiving, processing and outputting the recovered HDLC data stream; specifically, HDLC service processing comprises: adding packet header information and an identifier for the data: and adding packet header information and an identifier for the data comprises: adding the packet header information such as a port number, a time stamp, a length domain and the like, identifying a fill-in signaling unit, a link state signaling unit, and a message signaling unit, and decoding and counting the data; then, storing the processed data in a ZBT memory, wherein ZBT is a zero read-write bus conversion memory; each ZBT has 2M bytes capacity; two ZBTs operate in turn; when FPGA writes data transmitted from a line in ZBT1, the data in ZBT2 is read out, and transmitted to the host in the manner of interrupting DMA for the upper software to analyze; and data receiving and acquisition are completed.

Figure 2:
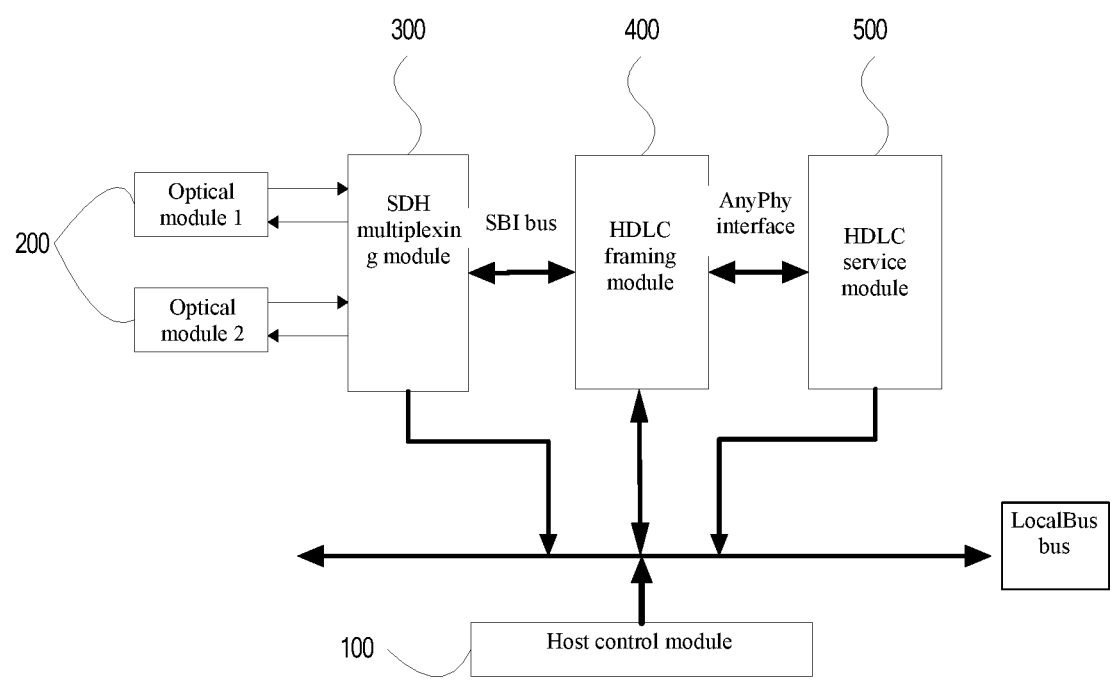
FIG. 2 is the device for acquiring data via a channelized optical port STM-4 HDLC provided in one embodiment of the present invention.
Figure 3:
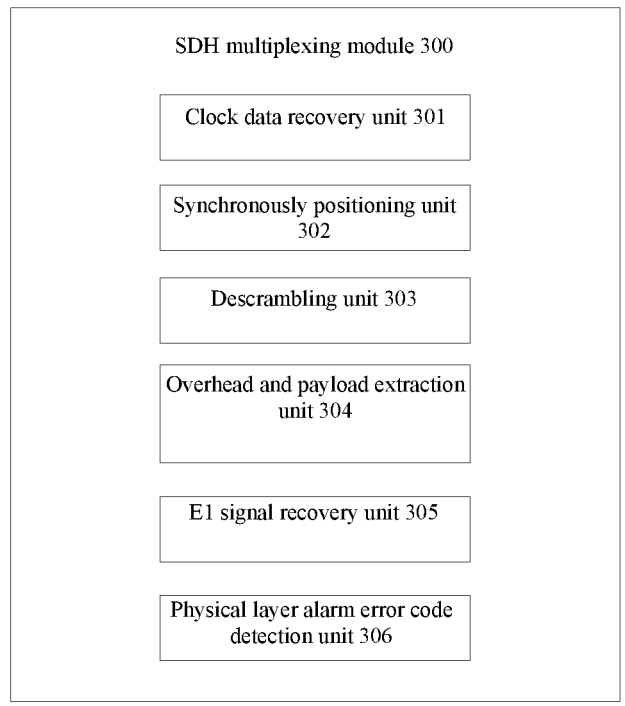
FIG. 3 is a schematic view of the SDH multiplexing module of the device for acquiring data via a channelized optical port STM-4 HDLC provided in one embodiment of the present invention.
Figure 4:
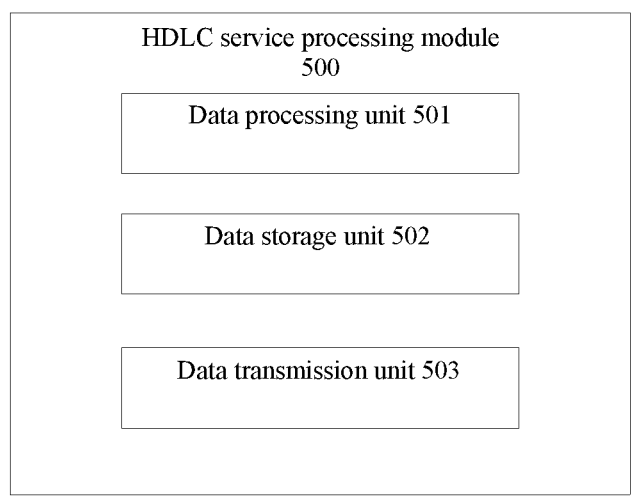
FIG. 4 is a schematic view of the HDLC service processing module of the device for acquiring data via a channelized optical port STM-4 HDLC provided in one embodiment of the present invention.

A feasible embodiment of the present invention provides a device for acquiring data via a channelized optical port STM-4 HDLC. Specifically, as shown in FIGS. 2, 3 and 4, the device for acquiring data via a channelized optical port STM-4 HDLC comprises:

A host control module 100, for transmitting configuration information to a board card, wherein the configuration information comprises the information pertaining to configured link type, HDLC frame type, E1 time slot occupation and the like; and the board card acquires data according to the configuration information;

An optical module 200, for receiving a signal and performing electrical signal-optical signal mutual conversion; specifically, a receiving terminal of the optical module converts an optical signal into an electrical signal, and a transmitting terminal converts an electrical signal to an optical signal;

An SDH multiplexing module 300, for processing an SDH signal, recovering an E1 signal, and mapping the E1 signal to an SBI bus; specifically, the SDH multiplexing module comprises:

A clock data recovery unit 301, for extracting a line clock from the electrical signal, and recovering clock data;

A synchronously positioning unit 302, for synchronously positioning the start and end of a data identifier frame, and completing frame delimitation;

A descrambling unit 303, for decoding data, and recovering the original SDH data;

An overhead and payload extraction unit 304, for processing a section overhead and extracting the payload;

An E1 signal recovery unit 305, for progressively removing the channel overheads and adjustment pointers of VC-4, TUG-3, TUG-2, TUG-12 and VC-12, then recovering a 252-link E1 signal, and mapping the signal to an SBI bus; and A physical layer alarm error code detection unit 306, for detecting in real time acquired SDH alarm error code information, wherein the alarm error code information comprises but not limited to: LOS, LOF, OOF, MS-AIS, AU-LOP, B1, B2 and B3 alarm error codes;

An HDLC framing module 400, for performing HDLC link deframe mapping, removing a frame header and an interpolated zero part in the HDLC link, and extracting the payload of a sliced HDLC packet; namely recovering an HDLC data stream; specifically, each HDLC link occupies the channel packet FIFO data with 8 consecutive long fields; the bit width of the channel packet FIFO is in units of a long field, namely 32 bits. Parallel-serial conversion is performed on the 32 bits data read from the channel packet FIFO; a frame header indication signal, an error frame indication signal and an HDLC link process enabling indication signal are generated according to the HDLC serial data stream, and are transmitted to an HDLC zero removing module. In the interpolated zero removing process, if the frame header indication signal is encountered, then the data packet of the HDLC channel is already ended, and the next process will begin; and if the error frame indication signal is encountered, then the processing of the current data packet will be ended, and the data packet of the HDLC channel will be discarded; and the interpolated zero removing process will re-start when the next frame header indication signal is received.

An HDLC service module 500, for receiving, processing and outputting the recovered HDLC data stream; specifically, the HDLC service processing module comprises:

A data processing unit 501, for adding packet header information and an identifier for the data, and decoding and counting the data, and comprising: adding the packet header information such as a port number, a time stamp, a length domain and the like, identifying a fill-in signaling unit, a link state signaling unit, and a message signaling unit, and decoding and counting the data;

A data storage unit 502, for storing the processed data in a memory; and

A data transmission unit 503, for transmitting the data to a host.

Further, the HDLC service processing module is configured to add the packet header information such as a port number, a time stamp, a length domain and the like, identify the identifier filling signaling unit, the link state signaling unit and the message signaling unit, count the data, and cache the data in a ZBT memory, wherein ZBT is a zero read-write bus conversion memory; each ZBT has 2M bytes capacity; two ZBTs operate in turn; when FPGA writes data transmitted from a line in ZBT1, the data in ZBT2 is read out, and transmitted to the host in the manner of interrupting DMA for the upper software to analyze; and data receiving and acquisition are completed.

The embodiment provides an operation flow of a channelized STM-4 HDLC test card. Before test, a terminal configures test data, comprising the information pertaining to the selection of E1 in STM-4, E1 link type, HDLC frame type, and the time slot occupation of the selected E1. The test data is processed as follows:

The optical module 1 and the optical module 2 transmit the data received from a device to be tested by the STM-4 to the SDH multiplexing module;

The STM-4 optical port in the SDH multiplexing module receives a serial 622M SDH signal from the optical module, and extracts a line clock therefrom, completes frame delimitation, recovers the original SDH data, processes the section overhead, explains the pointer, extracts the payload, progressively removes the channel overheads and adjustment pointers of VC-4, TUG-3, TUG-2 and TU-12, and obtains a VC-12 low order virtual container.

The HDLC framing module performs HDLC link deframe mapping, removes the frame header and the interpolated zero part in the HDLC link, and extracts the payload of the sliced HDLC packet.

The HDLC service processing module receives the HDLC data stream recovered by the HDLC processing module, completes the processes of time stamp adding, data decoding, data identifying and the like, and transmits to an upper layer via the host control module for a tester to use.

The descriptions above are only preferred embodiments of the present application, but are not intended to limit the present invention. And any modifications, equivalent substitutions, improvements and the like made within the spirit and principles of the present invention are all intended to be concluded in the protection scope of the present invention.

The invention claimed is:

1. A method for acquiring data via a channelized optical port STM-4 HDLC, comprising:
   receiving an optical signal from a transmission link via an STM-4 optical port;
   converting the received optical signal into an electrical signal;
   acquiring an E1 signal by means of signal processing;
   performing HDLC link deframe mapping, removing a frame header and an interpolated zero part in the HDLC link, and extracting the payload of a sliced HDLC packet; and
   receiving, processing and outputting a recovered HDLC data stream, wherein processing the recovered HDLC data stream includes:
      adding packet header information and an identifier for the data, and decoding and counting the data,
      storing the processed data in a memory, and
      transmitting the data to a host.

2. The method for acquiring data via a channelized optical port STM-4 HDLC according to claim 1, wherein recovering an E1 signal comprises:
   recovering clock data, extracting a line clock from the electrical signal;
   synchronously positioning, and completing frame delimitation;
   descrambling, and recovering SDH data;
   extracting overhead and payload, processing a section overhead, and extracting the payload; and
   signal recovery, progressively removing the channel overheads and adjustment pointers of VC-4, TUG-3, TUG-2, TUG-12 and VC-12, then recovering a 252-link E1 signal, and mapping the signal to an SBI bus.

3. The method for acquiring data via a channelized optical port STM-4 HDLC according to claim 1, wherein recovering an E1 signal further comprises: physical layer alarm error code detection, for detecting in real time acquired SDH alarm error code information, wherein the alarm error code information comprises but not limited to: LOS, LOF, OOF, MS-AIS, AU-LOP, B1, B2 and B3 alarm error codes.

4. The method for acquiring data via a channelized optical port STM-4 HDLC according to claim 1, wherein adding packet header information and an identifier for the data comprises: adding the packet header information such as a port number, a time stamp, a length domain and the like, identifying a fill-in signaling unit, a link state signaling unit, and a message signaling unit.

5. A device for acquiring data via a channelized optical port STM-4 HDLC, comprising:
   a host control module, for transmitting configuration information;
   an optical module, for receiving a signal and performing electrical signal-optical signal mutual conversion;
   an SDH multiplexing module, for processing an SDH signal, recovering an E1 signal, and mapping the E1 signal to an SBI bus;
   an HDLC framing module, for performing HDLC link deframe mapping, removing a frame header and an interpolated zero part in the HDLC link, and extracting the payload of a sliced HDLC packet; and
   an HDLC service module, for receiving, processing and outputting a recovered HDLC data stream, wherein the HDLC service module includes:
      a data processing unit, for adding packet header information and an identifier for the data, and decoding and counting the data;
      a data storage unit, for storing the processed data in a memory; and
      a data transmission unit, for transmitting the data to a host.

6. The device for acquiring data via a channelized optical port STM-4 HDLC according to claim 5, wherein the data processing unit comprises: adding packet header information and an identifier for the data comprises: adding the packet header information such as a port number, a time stamp, a length domain and the like, identifying a fill-in signaling unit, a link state signaling unit, and a message signaling unit, and decoding and counting the data.

7. The device for acquiring data via a channelized optical port STM-4 HDLC according to claim 5, wherein the SDH multiplexing module comprises:
   a clock data recovery unit, for extracting a line clock from the electrical signal;
   a synchronously positioning unit, for completing frame delimitation;
   a descrambling unit, for recovering SDH data;
   an overhead and payload extraction unit, for processing a section overhead and extracting the payload; and
   an E1 signal recovery unit, for progressively removing the channel overheads and adjustment pointers of VC-4, TUG-3, TUG-2, TUG-12 and VC-12, then recovering an E1 signal, and mapping the signal to an SBI bus.

8. The device for acquiring data via a channelized optical port STM-4 HDLC according to claim 5, wherein the SDH multiplexing module further comprises: a physical layer alarm error code detection unit, for detecting in real time acquired SDH alarm error code information.

* * * * *